Nov. 27, 1951 R. LIVINGSTON ET AL 2,576,616
MONITOR FOR FISSION GASES
Filed Sept. 20, 1949
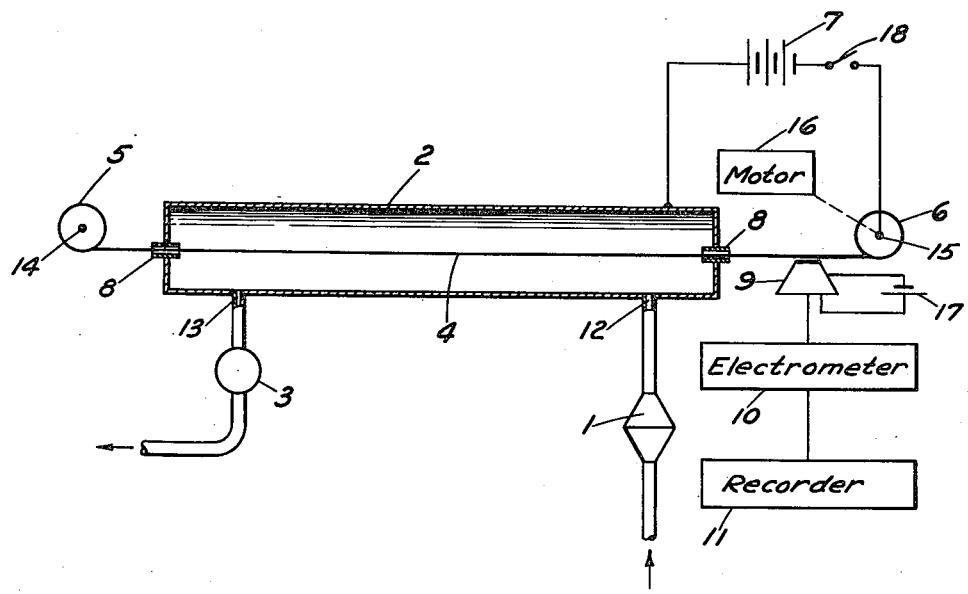
INVENTORS
Ralph Livingston &
BY Henri A. Levy
Roland A. Anderson
ATTORNEY Patented Nov. 27, 1951

2,576,616

UNITED STATES PATENT OFFICE 2,576,616

MONITOR FOR FISSION GASES

Ralph Livingston and Henri A. Levy, Oak Ridge, Tenn., assignors to the United States of America as represented by the United States Atomic Energy Commission Application September 20, 1949, Serial No. 116,720

9 Claims. (Cl. 250—83.6)

The present invention relates to monitoring apparatus and especially to apparatus for indicating the relative quantity of the radioactive fission gas content of a gaseous stream, or of the atmosphere.

In attempting to monitor a gaseous stream such as the coolant of a nuclear reactor for short-lived radioactive products such as the noble gases, xenons and kryptons, the time delay attendant with all apparatus known or suggested was prohibitive. The desired activities decayed before they could be measured to such a low intensity level that measurement was impractical. Ordinary probes or monitors would indicate total activity in the air stream, and would give no indication of the relative amount of only the short-lived radioactive fission gases. Because they are produced by nuclear fission, a measurement of the concentration of these gases will indicate the relative contamination of a reactor; that is, the amount of uranium or other fissionable material uncovered in the reactor lattice.

It may be desired to continuously monitor rooms wherein large quantities of radium are handled for radon, the radioactive decay product of radium. Conventional monitoring apparatus would be sensitive to all activities present in the room in addition to that from the radon, and therefore could not be utilized to detect only the specific radon activity. Chemical analysis methods are both inconvenient and time-consuming.

With full knowledge of the limitations of the prior art, we have as an object of our invention the provision of a method of and apparatus for determining the relative amount of radioactive fission gases in a gaseous stream, such as may be employed to cool a nuclear reactor.

Another object of our invention is to provide a method of and apparatus for determining the relative amount of radon present in laboratories or other spaces where large quantities of radium are handled.

A further object of our invention is to provide a method of and apparatus for detecting the presence in the atmosphere of large concentrations of short-lived gaseous fission products such as xenon, which might follow the explosion of a bomb by nuclear fission.

Another object of our invention is to provide apparatus for detecting recently formed fission products in the atmosphere in or about a reactor-equipped missile or airplane.

In accordance with our invention, we first remove any solid matter from the gaseous stream, or a sample portion thereof, then pass the stream or sample in a chamber through which a charged electrode is moving. Because the short-lived gasous fission products decay to atoms of normally solid elements, and because many of the gaseous species are very short-lived, many of the atoms of these species will decay to positive ions in the chamber and can be collected on the moving electrode. This electrode then passes out of the chamber and is monitored for radioactivity. The radiation intensity indicated by the monitor is then proportional to the amount of gaseous fission products in the stream.

The various components of and parameters affecting our invention will be described in detail hereinafter, in order to more clearly teach those versed in the art the various methods of employing our method and apparatus.

The type of filter employed in our invention is not critical, its function being to remove entirely the particulate content of the incoming gas, so that any ions collected on the wire could only be those formed after the gas leaves the filter. Depending on the size of particles occurring in the stream, the filter mesh size may vary, and reasonable life must be allowed before the filter will plug or stop up. The filter may be paper, cloth, metallic wool, or other suitable material, but the preferred embodiment of our invention utilizes a Chemical Warfare Service #6 paper filter.

The relative amount of the gaseous stream sampled is not critical, nor is the amount of atmospheric gas intake, but enough gas must be pulled through the chamber to deposit measurable activity on the wire. The amount of gas passing through the chamber per second, the chamber volume, the voltage gradient across the chamber, the electrode speed through the chamber and the time the gas is exposed to the electric field are parameters which will affect operation of our apparatus. It would be desirable to move the incoming gas from its source to the chamber at maximum speed, so that the high-activity, short-lived gases would reach the chamber as high on their decay curves as possible. The chamber should preferably be an elongated cylinder to allow the ions formed by decay to be exposed to the electric field as long as possible and insure maximum collection. The rate of flow through the chamber is not critical, within limits of commercially available blowers. Very slow speeds, of course, would allow all the activity to deposit on the wire near the intake while faster rates of flow will spread the ions over the entire chamber length of the wire. Sensitivity rises with flow rate, but substantially levels off after the activity is evenly distributed on the wire along the chamber.

After it collects the ions and leaves the chamber, the collecting electrode is essentially a transfer medium, therefore should move as rapidly as practicable to the monitor, so that the short-lived decay products carried thereon might reach the radiation detector at near their maximum disintegration rate, thereby producing a maximum signal. The voltage impressed between the chamber and collecting electrode may vary over a wide range for satisfactory results, the upper limit being a voltage at which breakdown of the gas would occur, and the lower desirable limit being that voltage at which all the positive ions formed in the chamber are collected on the moving electrode, called saturation potential. Breakdown potential depends on the particular gas, the pressure, temperature, and the configuration and material of the chamber and moving electrode. In the preferred embodiment of our invention described hereinafter, average voltage gradients of 100–300 volts per inch between a cylindrical chamber and a .004" central electrode have been successfully employed, with gas flowing through a 6 inch diameter brass cylindrical chamber at 10 to 25 cubic feet per minute. It is apparent that our apparatus provides a relative indication, not an actual quantitative analysis; therefore, the chamber voltage and the flow of gas should be adjusted, with the above described factors in mind, to values which give any convenient signal level when only "background" radiations are present. "Background" may be considered the radiation occurring during normal operation of the monitor; for example, the radiation being indicated on the recorder of one embodiment of our invention before a fissionable bomb explosion as contrasted to the much greater indication after fission products from the reaction are collected in our monitor.

The chamber employed must be conductive or lined with conductive material such that a potential may be maintained across it to create a field suitable for collecting positive ions on the wire. The size and contour may vary with the application of the apparatus, considering the amount of gas to be monitored and portability requirements. Mounted in opposite walls of the chamber, two feed-through insulators, which may be quartz, ceramic, or other suitable insulating material, serve to guide the moving electrode in and out of the chamber.

Openings are provided for entry of the gas at one part of the chamber and its exit at another part. The openings may be one inch in diameter and round, for convenience in threading piping to them. The piping should be fitted to the openings in a conventional manner to make a substantially gas-tight joint. The entry port for the gas may be located either near the entry point for the collecting electrode or near its exit.

In the preferred form of our invention, the chamber is a brass tube, six inches in diameter and four feet long, having inlet and exit openings near opposite ends, and closed at both ends save for the insulators mounted therein.

The moving electrode is preferably a wire, which may be chosen for tensile strength and for its size. Smaller wires are generally weaker, and in addition will cause a corona discharge at a lower operating voltage than will the larger wires. Stainless steel commercial recording wire .004" in diameter has been utilized in the preferred form of our invention, although any other wire strong enough to be rolled and unrolled on spools may be employed satisfactorily.

The electrode should be caused to move through the chamber at a substantially constant rate for continuous monitoring. A motor and a pair of spools are illustrated schematically in the attached figure for reeling wire in the desired path, but other methods for moving the electrode will suggest themselves to those versed in the art. The take-up spool diameter should be large compared to that of the wire, so that wire speed would not increase appreciably as the spool fills. A capstan drive for the wire, together with a slip clutch for the take-up spool, also have been successfully employed to maintain a constant wire speed.

Many methods of determining and indicating the radioactivity of the elements collected on the wire will be apparent to one versed in the art. The range of intensity of the beta-gamma radiation emitted may vary widely in individual applications, so that although an ionization chamber, vibrating reed electrometer, and recorder may preferably be employed for high intensities, a Geiger-Müller tube, count-rate meter or scaler, and a recorder may be economically employed for low intensity indication. The method of detection and indication employed in our invention is not critical, but any of the known methods and instruments for counting may be employed in our novel combination. For further example, a proportional counter might obviously be utilized together with count-rate circuits, and an electrical meter may be substituted for the recorder if no permanent record of the monitoring is desired.

The preferred embodiment of our apparatus is illustrated and our novel method for determining the radioactive fission gas content of a gaseous stream is described in conjunction with the accompanying drawing. The filter 1, which is preferably a Chemical Warfare Service #6 type, is located in the intake piping of chamber 2, which is a brass tube four feet long and 6 inches in diameter, closed at both ends but for ceramic insulators 8, 8, mounted in gas-tight relationship therewith. A positive displacement blower 3 may be located in the exhaust piping for impelling the gases through the chamber. Wire 4 is a stainless steel, four-mil recording wire wound on a conventional recording spool 5, which is mounted to turn freely on shaft 14. A large recording spool 6 is mounted and locked on shaft 15, and a constant speed motor 16 is geared to shaft 15. Ionization chamber 9 is energized by battery 17. The input circuit of vibrating reed electrometer 10 is electrically connected to the chamber 9, and the output circuit is connected to a strip-chart recorder 11. A power source or battery 7 maintains a potential of 300 volts between the chamber and the wire when switch 18 is closed, the wire being negative with respect to the chamber, so that positive ions will be attracted to the wire.

In operation of the apparatus illustrated, switch 18 is closed, applying full potential across chamber 2 and wire 4, and motor 16 and blower 3 are started. The motor drives shaft 15 and spool 6, to which one end of the wire 4 is attached, so that the wire unreels off spool 5, passes through the chamber 2, passes through ionization chamber 9, and winds on spool 6 at a substantially constant rate of travel. The gaseous stream is likewise moving away from the place where fission occurs at a substantially constant rate. The blower 3 pulls a portion of the gaseous stream through filter 1 and chamber 2, discharges the gases back to the stream. While the gases traverse the chamber 2, many of the atoms will decay to positive ions, which will be attracted to the wire 4 by the electric field maintained in the chamber. Some of the atoms or discharged ions collected on the wire are radioactive daughters of the radioactive fission gases and as they are carried by the wire 4 out of the chamber 2 and through the detector chamber 9, some will undergo radioactive decay. The radiation they emit will cause a small current to flow in the chamber 9, and this current will be measured by electrometer 10. A proportional voltage will be fed to recorder 11 by the electrometer in the conventional arrangement, and the recorder pen will mark the strip-chart at a point determined by that voltage, hence proportional to the abundance of short-lived fission gases in the stream sampled.

Many variations and equivalents of the described embodiment of our invention will suggest themselves to those versed in the art. Therefore, it is understood that the embodiment illustrated is not to be regarded as a limitation of our invention, but is rather to be regarded as illustrative only.

Having thus described our invention, we claim:

1. Apparatus for determining the relative abundance of the gaseous fission products in an airstream comprising a chamber fitted with entrance and exhaust openings, an electrode disposed in spaced relation to the walls of said chamber, means for moving said electrode through said chamber, radiation detecting and indicating means disposed adjacent said electrode external to said chamber, means for maintaining said electrode substantially negative with respect to said chamber, filter means, and means for impelling at least a portion of said airstream successively through said filter and said chamber.

2. In apparatus for determining the relative concentration of gaseous fission products having a relatively short half-life in an airstream, the combination of a chamber, a wire disposed in spaced relation therewith, means for maintaining said wire substantially negative with respect to said chamber, whereby positive ions are attracted to said wire, a filter disposed before the intake of said chamber, means for moving said wire through said chamber, means for conducting at least a portion of said airstream through said chamber, and means for determining and indicating the radioactivity of atoms collected on said wire.

3. Apparatus for determining the relative abundance of those particle-emitting gases which decay to solid radioactive products, comprising a filter, an elongated chamber having inlet and exit openings, impelling pumping means for moving gases to be sampled through said filter and then through said chamber openings; a wire disposed substantially along the axis of said chamber; means for maintaining said wire substantially negative to said chamber, means for moving said wire along said axis and through an opening in said chamber; and means external to said chamber for measuring and indicating the radioactivity of the said solid decay products collected on said wire.

4. Apparatus of the character described, comprising an electrically conducting tubular member having an opening near each extremity for the inflow and egress of gas, and an electrical insulator disposed in an opening in each extremity, a wire and a wire take-up means, said means being adapted to draw said wire axially through the interior of said tubular member, electrical means for maintaining a potential difference between said wire and said member insufficient to produce corona discharge, said electrical means being connected so that said wire is more negative than said tubular member, and means for measuring and indicating the radioactivity of atoms deposited on said wire, said measuring and indicating means being disposed outside the said tubular member.

5. Apparatus of the character described, comprising an elongated metal tubular member, having an opening near each extremity for the inflow and outflow of gaseous material and being closed at both extremities, a wire disposed substantially along the axis of said member, means for impressing on said wire an electrical potential more negative than that of said member but insufficient to cause a corona discharge, a first spool mounted on the drive shaft of an electric motor, one end of said wire being attached to said spool whereby said wire may be reeled onto said spool, a second spool mounted on a rotatable shaft, the opposite end of said wire being secured to said second spool; a pair of insulators, one disposed in each extremity of said tubular member for conducting said wire therethrough, and beta-gamma radiation detecting and indicating means disposed adjacent the wire near and external to the wire exit insulator for indicating the radioactivity of atoms collected on said wire.

6. Apparatus as claimed in claim 5 wherein said means for impressing on said wire an electrical potential more negative than that of said tubular member comprises a source of electrical potential having its positive terminal conductively connected to said member and its negative terminal conductively connected to said drive shaft, and said first spool forms an electrical connection between said shaft and said wire.

7. A method of determining the relative amount of particle-emitting noble gases present in an airstream, comprising the steps of: filtering the airstream, collecting the decay products of said fission products on a moving wire, continuously moving said wire out of the electric field during the collecting step, monitoring said products for radioactivity, and indicating the intensity of radiation from the products.

8. A method of detecting and determining the relative abundance of gaseous fission products in the atmosphere comprising the steps of sampling said atmosphere, filtering the sample obtained to remove substantially all particulate content, separating and collecting the charged decay products of said gaseous fission products in an electric field moving the collected positively charged components away from said field, and measuring and indicating the intensity of radiation from said components.

9. Apparatus for determining the relative concentration of radon in air comprising a chamber fitted with entrance and exhaust openings for passage of the radon-bearing air, an electrode extending through opposite walls of said chamber, a source of electrical potential for maintaining said electrode negative with respect to said chamber, means for moving said electrode at substantially constant speed through said chamber, radiation detecting and indicating means disposed adjacent the path of said electrode after its exit from said chamber, filter means for removing substantially all the particulate content of said air, and impelling means for moving said air successively through said filter and said chamber.

RALPH LIVINGSTON.
HENRI A. LEVY.

REFERENCES CITED

The following references are of record in the file of this patent:

UNITED STATES PATENTS

| Number | Name | Date |
|---|---|---|
| 1,808,709 | Blake | June 2, 1931 |
| 2,231,577 | Hare | Feb. 11, 1941 |
| 2,303,688 | Fearon | Dec. 1, 1942 |
| 2,490,298 | Ghiorso et al. | Dec. 6, 1949 |